US011116324B2

(12) United States Patent
Leng

(10) Patent No.: US 11,116,324 B2
(45) Date of Patent: Sep. 14, 2021

(54) DEVICE FOR CONNECTING A CROSS MEMBER AND A STAND MEMBER OF A BUNK BED AND A BUNK BED

(71) Applicant: NEW-TEC INTEGRATION (XIAMEN) CO., LTD., Fujian (CN)

(72) Inventor: Luhao Leng, Fujian (CN)

(73) Assignee: NEW-TEC INTEGRATION (XIAMEN) CO., LTD., Fujian (CN)

( * ) Notice: Subject to any disclaimer, the term of this patent is extended or adjusted under 35 U.S.C. 154(b) by 475 days.

(21) Appl. No.: 16/074,006

(22) PCT Filed: Jan. 6, 2017

(86) PCT No.: PCT/CN2017/070395
§ 371 (c)(1),
(2) Date: Jul. 30, 2018

(87) PCT Pub. No.: WO2017/128940
PCT Pub. Date: Aug. 3, 2017

(65) Prior Publication Data
US 2019/0038038 A1 Feb. 7, 2019

(30) Foreign Application Priority Data
Jan. 28, 2016 (CN) .......................... 201610059550.X

(51) Int. Cl.
*A47C 19/20* (2006.01)
*F16B 7/04* (2006.01)
(Continued)

(52) U.S. Cl.
CPC ............ *A47C 19/20* (2013.01); *A47C 19/028* (2013.01); *F16B 7/0426* (2013.01);
(Continued)

(58) Field of Classification Search
CPC ..... A47C 19/20; A47C 19/202; A47C 19/205; A47C 19/207; A47C 19/005; A47C 19/04;
(Continued)

(56) References Cited

U.S. PATENT DOCUMENTS 618,639 A * 1/1899 Bullard .................. F16D 1/096
403/370
1,051,427 A * 1/1913 McCluskey ......... F16L 37/0925
285/322
(Continued)

FOREIGN PATENT DOCUMENTS

CN 2208370 Y 9/1995
CN 2751171 Y 1/2006
(Continued)

*Primary Examiner* — Nicholas F Polito
*Assistant Examiner* — Morgan J McClure
(74) *Attorney, Agent, or Firm* — Cooper Legal Group, LLC

(57) ABSTRACT

A device for connecting a cross member and a stand member of a bunk bed includes a support tube and a connecting tube. The end portion of the cross member is disposed with a connecting base that has a conical hole running vertically throughout. A shaft sleeve is disposed in the conical hole. The external surface of the shaft sleeve and the side surface of the conical hole form a pair of coupled slope surfaces. The end face of the connecting tube is disposed with a plurality of grooves, so the bottom end portion of the side wall of the connecting tube forms with a plurality of elastic clamping jaws. One end of the support tube is inserted to the connecting tube. The shaft sleeve is sleeved on the connecting tube, the connecting base squeezes the shaft sleeve to make the two slope surfaces, contact tightly.

12 Claims, 7 Drawing Sheets

(51) Int. Cl.
*A47C 19/02* (2006.01)
*F16B 12/54* (2006.01)
*A47C 19/04* (2006.01)
*A47C 19/00* (2006.01)

(52) U.S. Cl.
CPC ............ *A47C 19/005* (2013.01); *A47C 19/04* (2013.01); *A47C 19/202* (2013.01); *F16B 7/0413* (2013.01); *F16B 12/54* (2013.01)

(58) Field of Classification Search
CPC ..... A47C 19/045; A47C 19/22; A47C 19/028; A47C 19/024; A47C 19/021; A47C 19/12; A47C 19/025; A47C 19/02; F16B 7/0426; F16B 7/0413; F16B 7/0446; F16B 7/048; F16B 7/18; F16B 7/182; F16B 7/187; F16B 12/54; F16B 12/56; F16B 12/58; F16B 12/60; F16B 12/50; F16B 12/52; F16B 12/46; F16B 12/44; F16B 12/48; F16B 12/02; F16B 12/10; F16B 12/26; F16B 12/30; F16B 12/32; F16B 2012/103; F16B 2/065; F16B 2/14; F16B 5/06; F16B 5/0614; F16B 5/0621; F16B 5/0678
See application file for complete search history.

(56) References Cited

U.S. PATENT DOCUMENTS

| | | | | |
|---|---|---|---|---|
| 1,806,687 A * | 5/1931 | Hoover | F16B 2/065 | 403/312 |
| 2,060,523 A * | 11/1936 | Packer | D06N 3/0002 | 279/82 |
| 2,841,425 A * | 7/1958 | Oeters | B25G 1/04 | 403/104 |
| 3,338,605 A * | 8/1967 | Stoeber | F16B 7/20 | 403/174 |
| 3,361,460 A * | 1/1968 | Gerhart | F16B 3/06 | 403/16 |
| 3,523,508 A * | 8/1970 | Maslow | A47B 57/265 | 108/147.13 |
| 3,675,598 A * | 7/1972 | Kesilman | A47B 57/26 | 108/147.13 |
| 3,747,965 A * | 7/1973 | Wing | F16B 12/42 | 403/173 |
| 3,757,705 A * | 9/1973 | Maslow | F16B 12/52 | 108/147.13 |
| 3,765,343 A * | 10/1973 | Ettlinger, Jr. | A47B 57/26 | 108/106 |
| 3,851,601 A * | 12/1974 | Davis | F16B 12/02 | 108/158.11 |
| 3,874,511 A * | 4/1975 | Maslow | A47B 96/021 | 211/153 |
| 4,128,064 A * | 12/1978 | Chung | A47B 57/265 | 108/147.13 |
| 4,138,953 A * | 2/1979 | Tashman | A47B 57/265 | 108/147.13 |
| 4,158,336 A * | 6/1979 | Brescia | F16B 9/023 | 108/190 |
| 4,378,172 A * | 3/1983 | Groschupp | F16M 11/32 | 403/104 |
| 4,627,543 A * | 12/1986 | Nicely | A47B 57/265 | 108/147.13 |
| 4,754,712 A * | 7/1988 | Olson | A47B 57/265 | 108/107 |
| 4,852,501 A * | 8/1989 | Olson | A47B 57/265 | 108/107 |
| 4,887,849 A * | 12/1989 | Briet | F16L 37/098 | 285/91 |
| 4,948,149 A * | 8/1990 | Lin | A63B 61/02 | 403/104 |
| 4,989,519 A * | 2/1991 | Welsch | A47B 47/04 | 108/192 |
| 5,517,878 A * | 5/1996 | Klein | B62K 21/16 | 403/371 |
| 5,881,653 A * | 3/1999 | Pfister | A47B 87/0223 | 108/147.13 |
| 6,045,291 A * | 4/2000 | Ruehle | F16B 19/1081 | 403/28 |
| 6,095,713 A * | 8/2000 | Doyle | F16B 7/04 | 403/97 |
| 6,123,035 A * | 9/2000 | Pfister | A47B 87/0223 | 108/147.13 |
| 6,142,698 A * | 11/2000 | Nutter | F16B 7/0426 | 403/109.1 |
| 6,247,414 B1 * | 6/2001 | Sikora | A47B 87/0223 | 108/147.13 |
| 6,260,488 B1 * | 7/2001 | Yang | A47B 57/545 | 108/107 |
| 6,626,605 B1 * | 9/2003 | Dean | F16B 7/025 | 108/147.12 |
| 6,948,435 B1 * | 9/2005 | Sheng | A47B 47/0016 | 108/180 |
| 6,966,080 B2 * | 11/2005 | Connell | A47C 17/86 | 211/168 |
| D518,365 S * | 4/2006 | Wamsley | D8/382 | |
| 7,096,523 B2 * | 8/2006 | Hennings | A47C 19/04 | 5/11 |
| 9,044,100 B1 * | 6/2015 | Wang | A47C 19/20 | |
| 9,109,730 B2 * | 8/2015 | Zimmer | A47G 29/1216 | |
| 10,349,751 B2 * | 7/2019 | Leng | A47C 19/02 | |
| 2004/0104319 A1 * | 6/2004 | Dean | F16B 7/025 | 248/146 |
| 2005/0273929 A1 * | 12/2005 | Hennings | A47C 19/22 | 5/201 |
| 2007/0077115 A1 * | 4/2007 | Lhotak | F16D 1/02 | 403/293 |
| 2007/0164174 A1 * | 7/2007 | Hung | F16B 12/40 | 248/159 |
| 2010/0180379 A1 * | 7/2010 | Leng | A47C 19/20 | 5/425 |

FOREIGN PATENT DOCUMENTS

| | | |
|---|---|---|
| CN | 201055152 Y | 5/2008 |
| CN | 202681216 U | 1/2013 |
| CN | 103462411 A | 12/2013 |
| CN | 203693021 U | 7/2014 |
| CN | 205493263 U | 8/2016 |
| CN | 105962686 A | 9/2016 |
| KR | 20040016910 A | 2/2004 |

* cited by examiner

DEVICE FOR CONNECTING A CROSS MEMBER AND A STAND MEMBER OF A BUNK BED AND A BUNK BED

TECHNICAL FIELD

The present invention relates to a bunk bed, particularly to connecting of a cross member and a stand member.

RELATED ART

Spared parts are assembled to use after transportation that reduces transportation fees and improves the transportation efficiency. But they are difficult to assemble. A situation often happens that screwing tool like a screw drive is needed to assemble or disassemble two pipes, which are connected by a bolt, that the operation is difficult and troublesome. Particularly for a bunk bed, the stand member of the bunk bed is high to 2 meters, the bunk bed may list to its side due to unstable connection of the cross member and the stand member or mispositioning of the cross member and the stand member. Therefore, existing bunk bed uses a quantity of bolts to fix at the connection portion of the cross member and the stand member, the assembly is troublesome and labor-waste.

SUMMARY OF THE INVENTION

The present invention is provided with a quick assembly and disassembly structure of a cross member and a stand member of a bunk bed to overcome the disadvantages of the existing known technology. The technical proposal of the present invention is that:

A device for connecting a cross member and a stand member of a bunk bed, the stand member comprises a support tube and a connecting tube, wherein the end portion of the cross member is disposed with a connecting base, the connecting base is disposed with a conical hole running vertically throughout, a shaft sleeve is movably disposed in the conical hole, the external surface of the shaft sleeve and the side surface of the conical hole form a pair of slope surfaces coupled to each other, the end face of the connecting tube is disposed with a plurality of grooves, the end portion of the side wall of the connecting tube forms with a plurality of clamping jaws, one end of the support tube is inserted to the connecting tube, the shaft sleeve is sleeved on the connecting tube, the connecting base is coupled to the shaft sleeve in tight way or interference way, the shaft sleeve presses the clamping jaws to deform inwardly to hold the support tube tightly.

In another preferred embodiment, the shaft sleeve is conical shaped, the external surface of the shaft sleeve is a conical surface.

In another preferred embodiment, the small bore diameter end of the shaft sleeve is disposed with a threaded portion, the threaded portion extends out of the connecting base, the nut is threaded to the threaded portion, the nut presses on the connecting base, the nut is threaded to increase the clamping force of the two slope surfaces.

In another preferred embodiment, the shaft sleeve is made of plastic.

A but bed applies above mentioned connecting device, the bunk bed comprises an upper cross member, a lower cross member and a stand member, the stand member comprises an upper support tube, the connecting tube and a lower support tube;

The lower cross member, the connecting tube and the lower support tube are connected by above mentioned connecting device.

And/or the upper cross member, the connecting tube and the upper support tube are connected by above mentioned connecting device.

Compared to the existing known technology, the technical proposal of the present invention has following advantages:

1. The connecting base is used to squeeze the shaft sleeve to make the two slope surfaces tightly connected, the shaft sleeve presses the elastic clamping jaws to bend and deform inwardly to hold the support tube tightly, making the connecting tube, the support tube and the cross member fixedly connected. The assembly and disassembly are quite quick and simple.

2. One end of the small bore diameter of the shaft sleeve is disposed with a threaded portion, the nut is threaded to the threaded portion, the nut presses the connecting base, the clamping force of the two slope surfaces is increased by threading the nut. The assembly and disassembly are convenient.

BRIEF DESCRIPTION OF THE DRAWINGS

The present invention will be further described with the drawings and the embodiments.

DETAILED DESCRIPTION OF THE EMBODIMENTS

Figure 1:
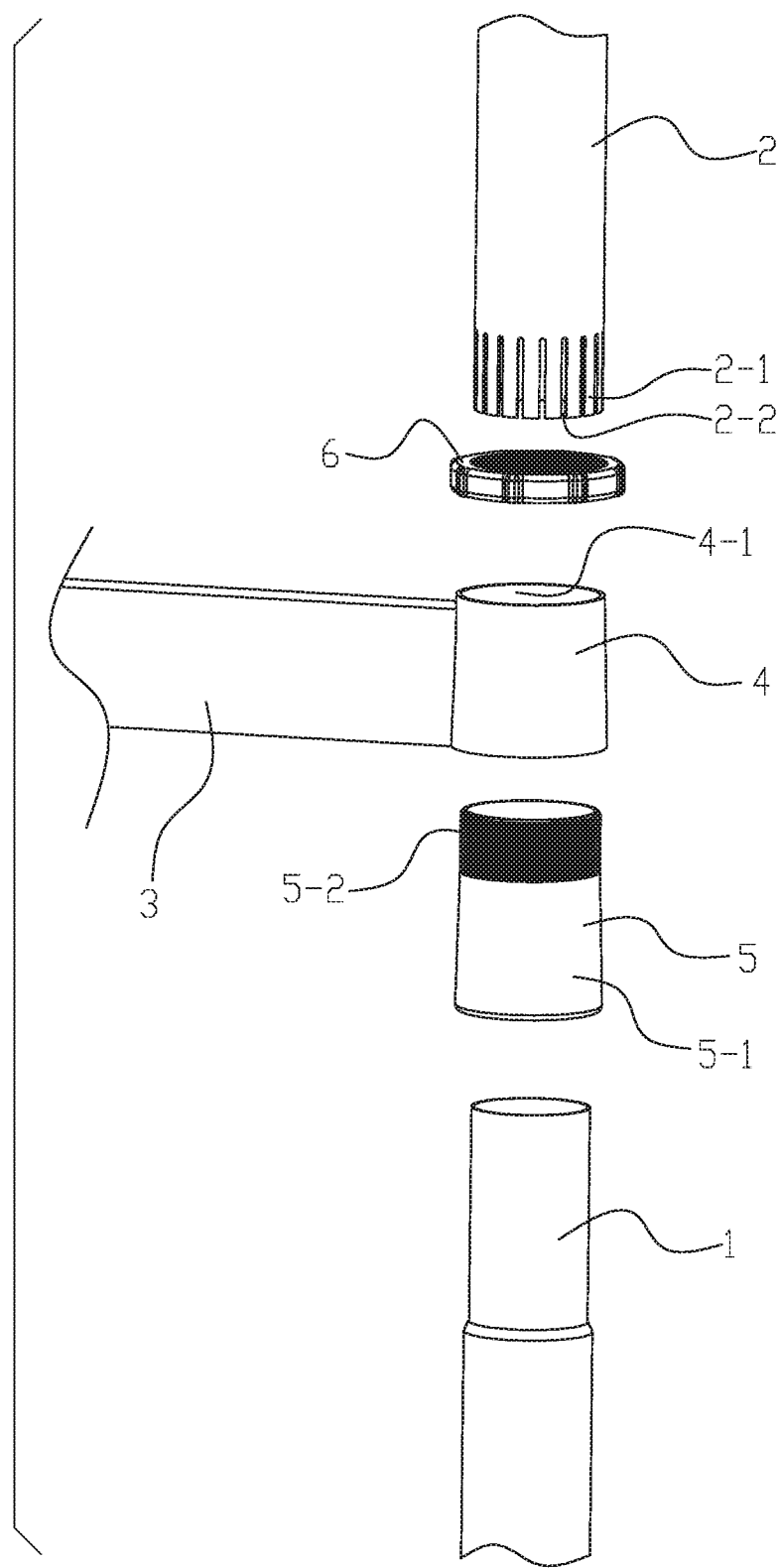
FIG. 1 illustrates an exploded diagram of the quick detachable mechanism of the cross member and the stand member of the bunk bed of the present invention.
Figure 2:
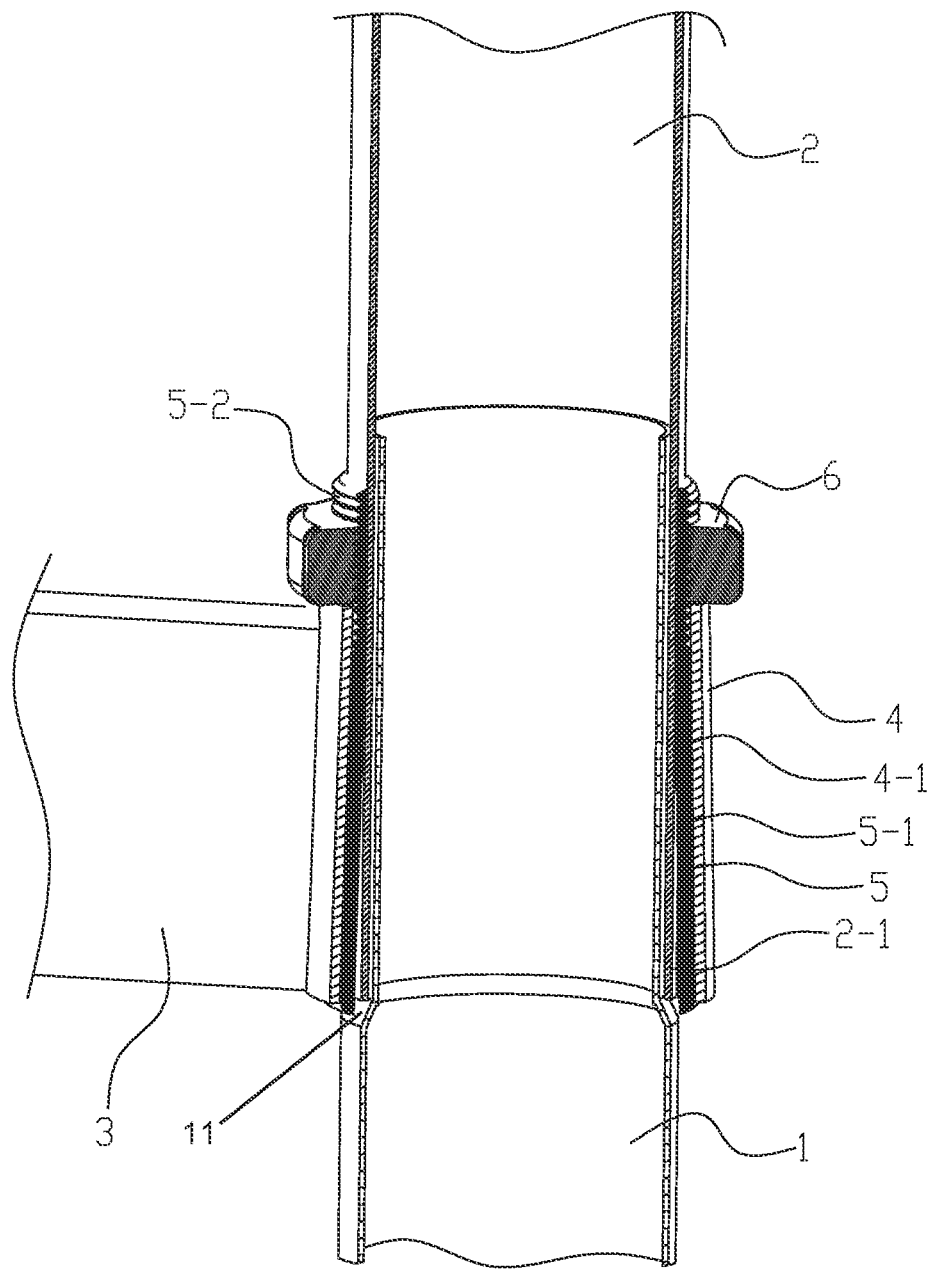
FIG. 2 illustrates a schematic diagram of the quick detachable mechanism of FIG. 1.

Referring to FIG. 1 and FIG. 2, a quick detachable mechanism of a cross member and a stand member of a bunk bed of the present invention is provided. The stand member comprises a support tube (1) and a connecting tube (2); the support tube (1) is disposed below the cross member (3), the connecting tube (2) is disposed above the lower cross member (3).

The end portion of the cross member (3) is disposed with a connecting base (4), the connecting base (4) is disposed with a conical hole running vertically throughout, a shaft sleeve (5) is disposed in the conical hole. The external surface (5-1) of the shaft sleeve (5) and the side surface (4-1) of the conical hole form a pair of slope surfaces coupled to each other. The shaft sleeve (5) is inserted to the conical hole from end up; the more the shaft sleeve (5) moves upwardly, more tightly the external surface (5-1) of the shaft sleeve and the side surface (4-1) of the conical hole contact.

The bottom end face of the connecting tube (2) is disposed with a plurality of grooves (2-2), so the bottom end portion of the side wall of the connecting tube forms with a plurality of elastic clamping jaws (2-1). The top end of the support tube (1) is inserted to the bottom portion of the connecting tube (2) and is surrounded by the elastic clamping jaws (2-1). The grooves (2-2) are elongated U shaped, and the grooves are arranged in annular array, correspondingly, the clamping jaws (2-1) are arranged in annular array.

The shaft sleeve (5) is sleeved on the connecting tube (2), the connecting base (4) squeezes the shaft sleeve (5) to make the two slope surfaces (4-1), (5-1) contact tightly in tight way or in inference way, leading to the connection of the support tube (1), the connecting tube (2) and the cross member (3).

Preferred, the shaft sleeve (5) is made of plastic or other easily deformed materials. The shaft sleeve (5) is conical shaped, the external surface of the shaft sleeve is a conical surface, so the external surface (5-1) of the shaft sleeve (5) and the side surface (4-1) of the conical hole are a pair of conical surfaces coupled to each other. The small bore diameter end of the shaft sleeve (5) is disposed with a threaded portion (5-2), which extends out of the connecting base (4). A nut (6) is threaded to the threaded portion (5-2), the nut (6) presses on the connecting base (4), the nut (6) is threaded to increase the clamping force between the two slopes surfaces (4-1), (5-1). The shaft sleeve (5) comprise a small end and a large end, an outer diameter of the small end of the shaft sleeve (5) is smaller than an outer diameter of the large end of the shaft sleeve (5). An outer side of the support tube (1) tapers outward and away from the plurality of clamping jaws (2-1) to define an inclined surface (11). The small end of the shaft sleeve (5) is disposed away from the plurality of clamping jaws (2-1), and the large end of the shaft sleeve (5) abuts the inclined surface (11) and the plurality of clamping jaws (2-1) to enable the plurality of clamping jaws (2-1) to be deformed to hold the support tube (1).

Figure 3:
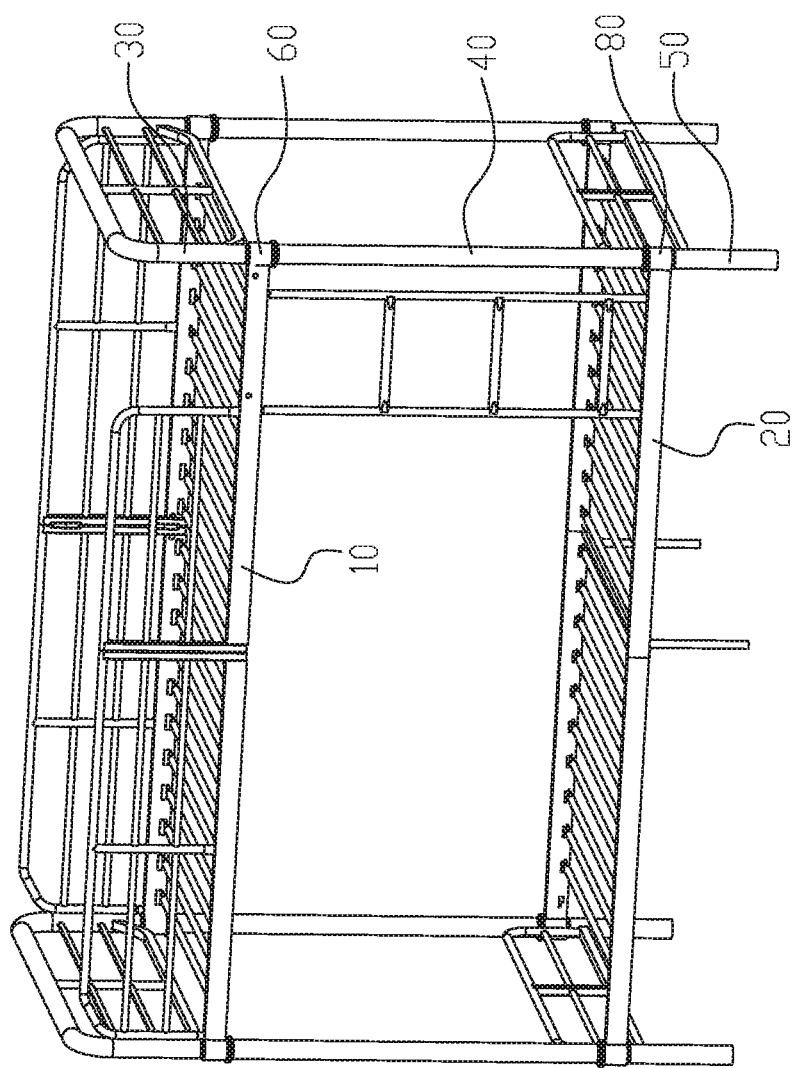
FIG. 3 illustrates a schematic diagram of the bunk bed of the present invention.
Figure 4:
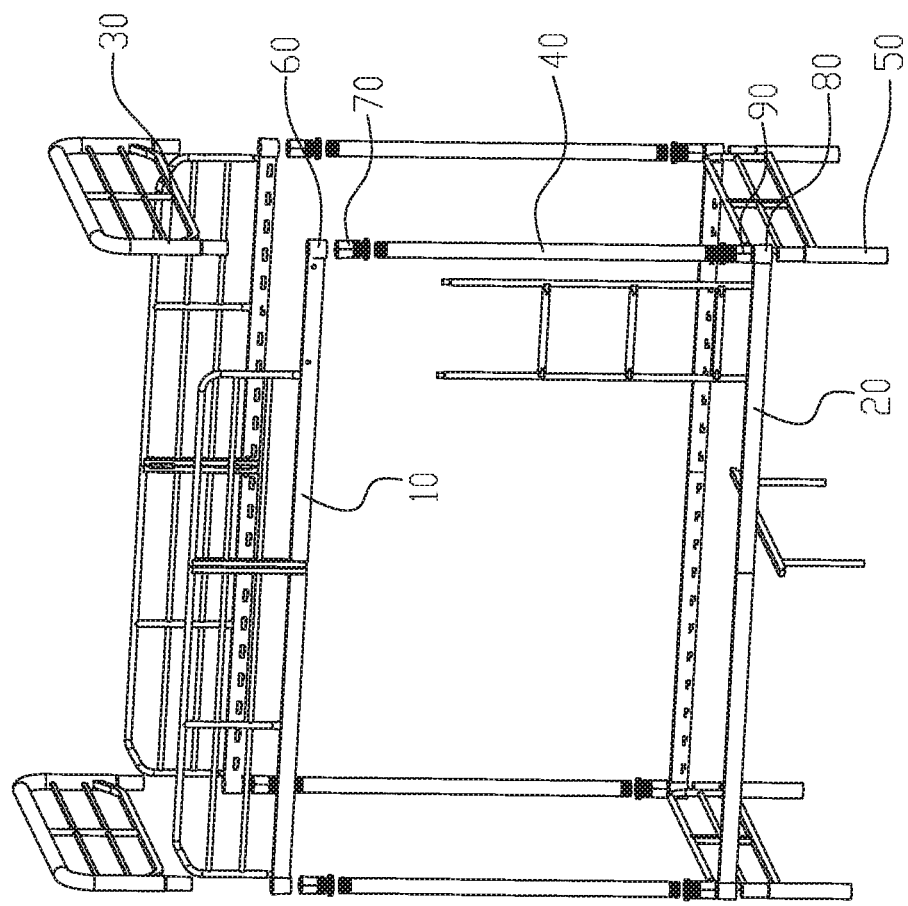
FIG. 4 illustrates an exploded diagram of the bunk bed of FIG. 3.
Figure 5:
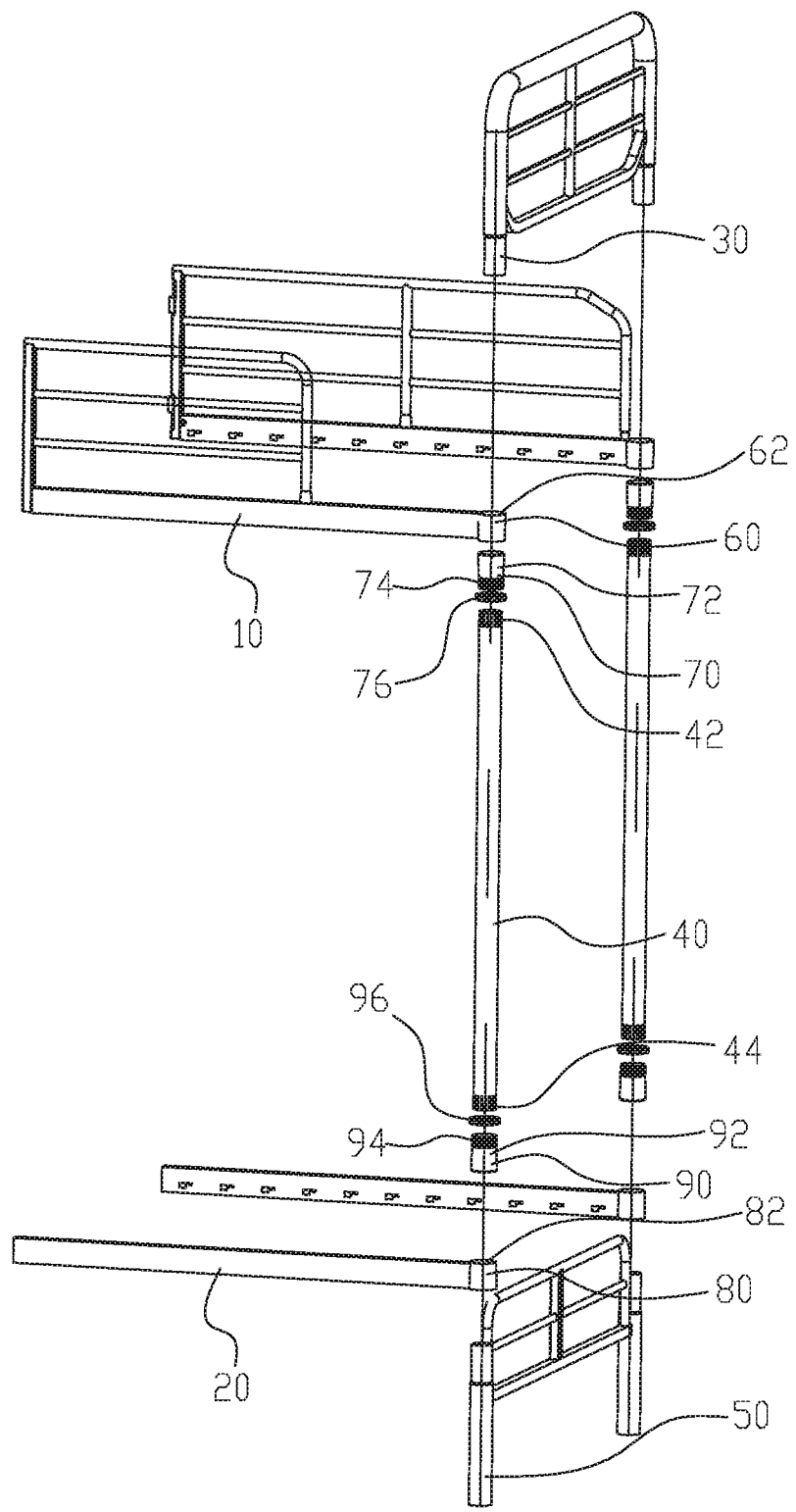
FIG. 5 illustrates a partial exploded diagram of the bunk bed of FIG. 3.

Referring to FIGS. 3-5, a bunk bed of the present invention comprises an upper cross member (10), a lower cross member (20) and a stand member. The stand member has three sections, which are an upper support tube (30), a connecting tube (40) and a lower support tube (50). The upper cross member (10), the upper support tube (30) and the connecting tube (40) are connected by above mentioned connecting device. Similarly, the lower cross member (20), the connecting tube (40) and the lower support tube (50) are connected by above mentioned connecting device.

Figure 6:
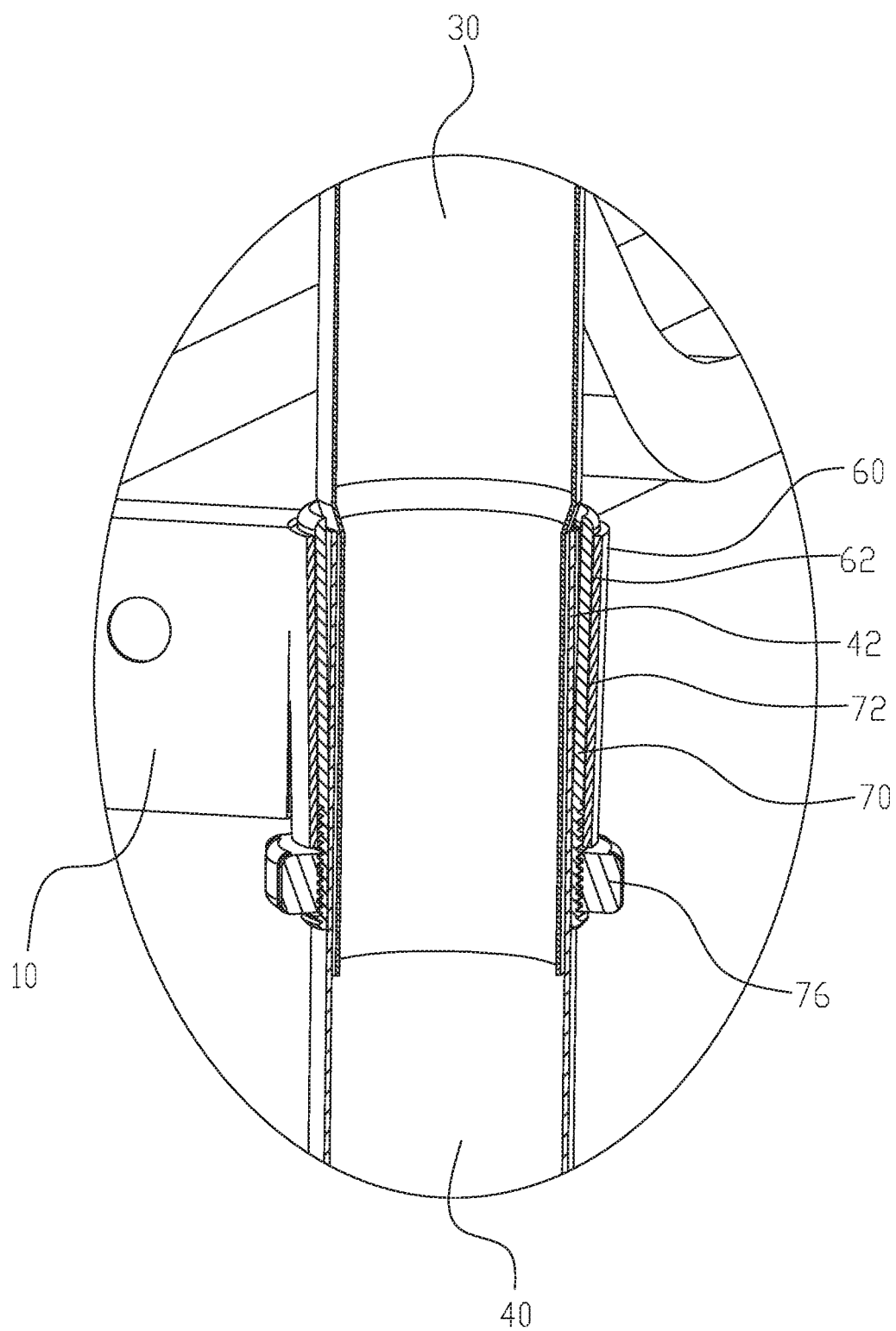
FIG. 6 illustrates a schematic diagram of the connecting of the upper cross member, the upper support tube and the connecting tube of the bunk bed of FIG. 3.

Referring to FIG. 5 and FIG. 6, the end portion of the upper cross member (10) is disposed with a connecting base (60), the connecting base (60) is disposed with a conical hole running vertically throughout, the conical hole is small end up, a shaft sleeve (70) is disposed in the conical hole. The external surface (72) of the shaft sleeve (70) and the side surface (62) of the conical hole form a pair of slope surfaces coupled to each other. The top end face of the connecting tube (40) is disposed with a plurality of grooves, so the top end portion of the side wall of the connecting tube forms with a plurality of elastic clamping jaws (42). The bottom portion of the upper support tube (30) is inserted to the top portion of the connecting tube (40) and is surrounded by the elastic clamping jaws (42). The shaft sleeve (70) is sleeved on the connecting tube (40), the connecting base (60) squeezes the shaft sleeve (70) to make the two slope surfaces (62), (72) contact tightly, the shaft sleeve (70) presses the elastic clamping jaws (42) to bend inwardly to hold the upper support tube (30) tightly.

Preferred, the shaft sleeve (70) is a plastic element. The shaft sleeve (70) is a conical sleeve, the external surface of the shaft sleeve is a conical surface. The small bore diameter end of the shaft sleeve (70) is disposed with a threaded portion (74), which extends downwardly out of the connecting base (60), a nut (76) is threaded to the threaded portion (74), the nut (76) presses on the connecting base (60), the nut (76) is threaded to increase the clamping force between the two slopes surfaces (62), (72).

It is understood that the elastic clamping jaws (42) can be disposed on the upper support tube (30), the top portion of the connecting tube (40) is inserted to the upper support tube (30), the shaft sleeve (70) is sleeved on the upper support tube (30), the shaft sleeve (70) presses the elastic clamping jaws (42) to bend inwardly and deform to hold the connecting tube (40) tightly, so the upper cross member (10), the upper support tube (30) and the connecting tube (40) are connected.

Figure 7:
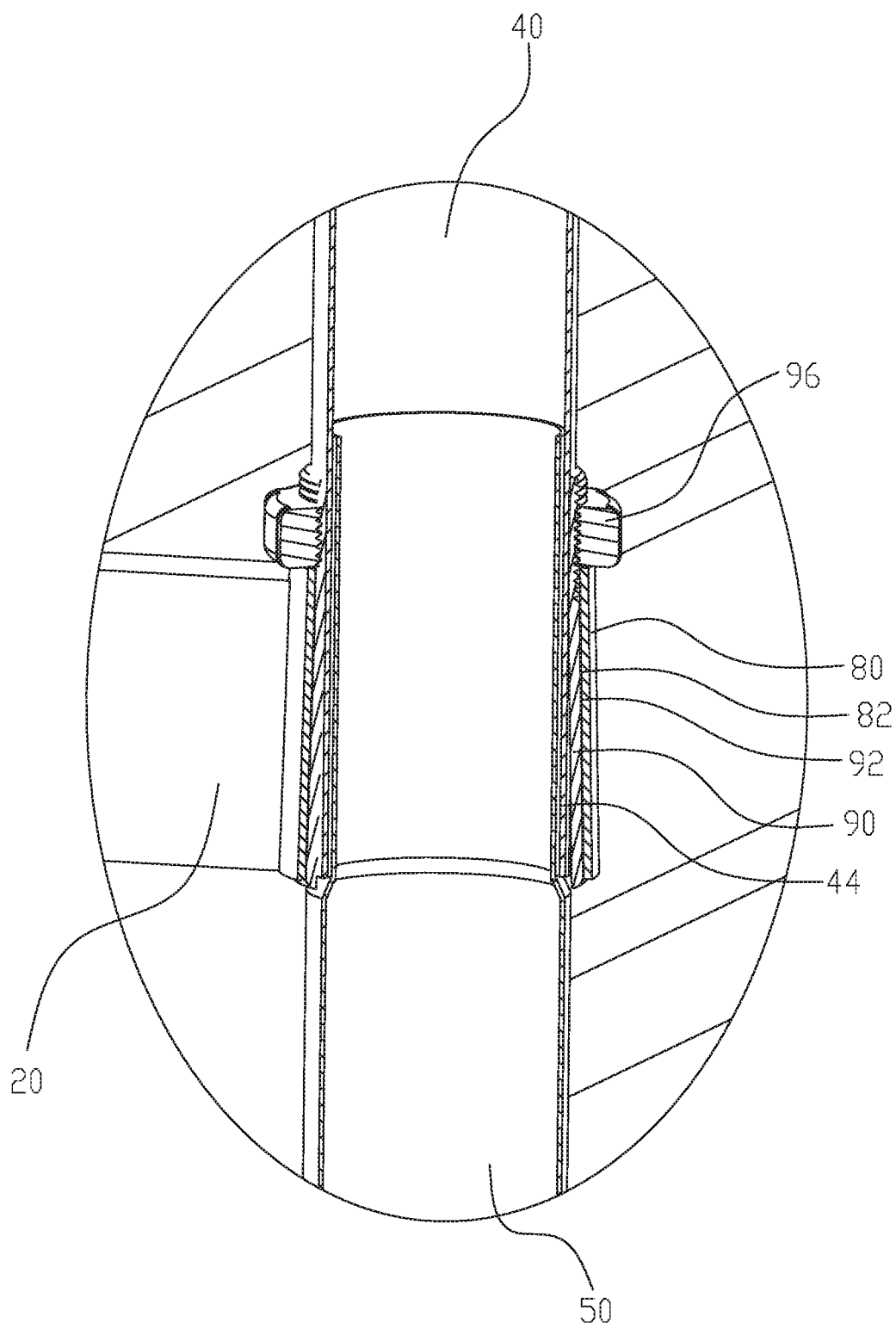
FIG. 7 illustrates a schematic diagram of the connecting of the lower cross member, the connecting tube and the lower support tube of the bunk bed of FIG. 3.

Referring to FIG. 5 and FIG. 7, the end portion of the lower cross member (20) is disposed with a connecting base (80), the connecting base (80) is disposed with a conical hole running vertically throughout, the conical hole is big end up, a shaft sleeve (90) is disposed in the conical hole. The external surface (92) of the shaft sleeve (90) and the side surface (82) of the conical hole form a pair of slope surfaces coupled to each other. The bottom end face of the connecting tube (40) is disposed with a plurality of grooves, so the top end portion of the side wall of the connecting tube forms with a plurality of elastic clamping jaws (44). The top portion of the lower support tube (50) is inserted to the bottom portion of the connecting tube (40) and is surrounded by the elastic clamping jaws (44). The shaft sleeve (90) is sleeved on the connecting tube (40), the connecting base (80) squeezes the shaft sleeve (90) to make the two slope surfaces (82), (92) contact tightly, the shaft sleeve (90) presses the elastic clamping jaws (44) to bend inwardly to hold the lower support tube (50) tightly.

Preferred, the shaft sleeve (90) is a plastic element. The shaft sleeve (90) is a conical sleeve, the external surface of the shaft sleeve is a conical surface. The small bore diameter end of the shaft sleeve (90) is disposed with a threaded portion (94), which extends downwardly out of the connecting base (80), a nut (96) is threaded to the threaded portion (94), the nut (96) presses on the connecting base (80), the nut (96) is threaded to increase the clamping force between the two slopes surfaces (82), (92).

It is understood that the elastic clamping jaws (44) can be disposed on the lower support tube (50), the bottom portion of the connecting tube (40) is inserted to the lower support tube (50), the shaft sleeve (90) is sleeved on the lower support tube (50), the shaft sleeve (90) presses the elastic clamping jaws (44) to bend inwardly and deform to hold the connecting tube (40) tightly, so the lower cross member (20), the connecting tube (40) and the lower support tube (40) are connected.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention is provided with a device for connecting a cross member and a stand member of a bunk bed and a bunk bed, the assembly and disassembly are quite quick and simple. The present invention has well industrial applicability.

What is claimed is:

1. A device for connecting a cross member and a stand member of a bunk bed, wherein:
   the stand member comprises a support tube and a connecting tube,
   an end portion of the cross member is disposed with a connecting base,
   the connecting base is disposed with a conical hole vertically penetrating the connecting base,
   a shaft sleeve is movably disposed in the conical hole,
   an external surface of the shaft sleeve and a side surface of the conical hole form a pair of sloped surfaces coupled to each other,
   an end surface of the connecting tube is disposed with a plurality of grooves to enable an end portion of a side wall of the connecting tube to form a plurality of clamping jaws,
   one end of the support tube is disposed in the connecting tube,
   the shaft sleeve encompasses the connecting tube,
   the connecting base is coupled to the shaft sleeve,
   the shaft sleeve comprise a small end and a large end,
   an outer diameter of the small end of the shaft sleeve is smaller than an outer diameter of the large end of the shaft sleeve,
   an outer side of the support tube tapers outward and away from the plurality of clamping jaws to define an inclined surface,
   the small end of the shaft sleeve is disposed away from the plurality of clamping jaws, and
   the large end of the shaft sleeve abuts the inclined surface and the plurality of clamping jaws to enable the plurality of clamping jaws to be deformed to hold the support tube.

2. The device for connecting the cross member and the stand member of the bunk bed according to claim 1, wherein:
   the shaft sleeve is conical, and
   the external surface of the shaft sleeve is a conical surface.

3. The device for connecting the cross member and the stand member of the bunk bed according to claim 2, comprising:
   a nut, wherein:
      the small end of the shaft sleeve is disposed with an inner hole,
      the large end of the shaft sleeve is disposed with an inner hole,
      a diameter of the inner hole of the small end of the shaft sleeve is smaller than a diameter of the inner hole of the large end of the shaft sleeve,
      the small end of the shaft sleeve is disposed with a threaded portion,
      the threaded portion extends out of the connecting base, and
      the nut is screwed to the threaded portion.

4. The device for connecting the cross member and the stand member of the bunk bed according to claim 1, wherein the shaft sleeve is made of plastic or deformable materials.

5. A bunk bed, comprising:
   an upper cross member,
   a lower cross member, and
   a stand member, wherein:
      the stand member comprises an upper support tube, a connecting tube, and a lower support tube,
      a top end of the connecting tube is connected to the upper cross member and the upper support tube,
      an end portion of the lower cross member is disposed with a first connecting base,
      the first connecting base is disposed with a first conical hole vertically penetrating the first connecting base,
      a first shaft sleeve is movably disposed in the first conical hole,
      an external surface of the first shaft sleeve and a side surface of the first conical hole form a pair of sloped surfaces coupled to each other,
      a bottom end surface of the connecting tube is disposed with a plurality of first grooves to enable a bottom end portion of a side wall of the connecting tube to form a plurality of first clamping jaws,
      a top portion of the lower support tube is disposed in a bottom portion of the connecting tube,
      the first shaft sleeve encompasses the connecting tube,
      the first connecting base is coupled to the first shaft sleeve,
      the first shaft sleeve comprise a small end and a large end,
      an outer diameter of the small end of the first shaft sleeve is smaller than an outer diameter of the large end of the first shaft sleeve,
      an outer side of the lower support tube tapers outward and away from the plurality of first clamping jaws to define a first inclined surface,
      the small end of the first shaft sleeve is disposed away from the plurality of first clamping jaws, and
      the large end of the first shaft sleeve abuts the first inclined surface and the plurality of first clamping jaws to enable the plurality of first clamping jaws to be deformed to hold the lower support tube.

6. The bunk bed according to claim 5, wherein:
   an end portion of the upper cross member is disposed with a second connecting base,
   the second connecting base is disposed with a second conical hole vertically penetrating the second connecting base,
   a second shaft sleeve is movably disposed in the second conical hole,
   an external surface of the second shaft sleeve and a side surface of the second conical hole form a pair of sloped surfaces coupled to each other,
   a top end surface of the connecting tube is disposed with a plurality of second grooves to enable a top end portion of the side wall of the connecting tube to form a plurality of second clamping jaws,
   a bottom portion of the upper support tube is disposed in a top portion of the connecting tube,
   the second shaft sleeve encompasses the connecting tube,
   the second connecting base is coupled to the second shaft sleeve,
   the second shaft sleeve comprise a small end and a large end,
   an outer diameter of the small end of the second shaft sleeve is smaller than an outer diameter of the large end of the second shaft sleeve,
   an outer side of the upper support tube tapers outward and away from the plurality of second clamping jaws to define a second inclined surface,
   the small end of the second shaft sleeve is disposed away from the plurality of second clamping jaws, and
   the large end of the second shaft sleeve abuts the second inclined surface and the plurality of second clamping jaws to enable the plurality of second clamping jaws to be deformed to hold the upper support tube.

7. The bunk bed according to claim 6, wherein:
the first shaft sleeve is conical,
the external surface of the first shaft sleeve is a conical surface,
the second shaft sleeve is conical, and
the external surface of the second shaft sleeve is a conical surface.

8. The bunk bed according to claim 7, comprising:
a first nut, and
a second nut, wherein:
　the small end of the first shaft sleeve is disposed with an inner hole,
　the large end of the first shaft sleeve is disposed with an inner hole,
　a diameter of the inner hole of the small end of the first shaft sleeve is smaller than a diameter of the inner hole of the large end of the first shaft sleeve,
　the small end of the first shaft sleeve is disposed with a first threaded portion,
　the first threaded portion extends out of the first connecting base,
　the first nut is screwed to the first threaded portion,
　the small end of the second shaft sleeve is disposed with an inner hole,
　the large end of the second shaft sleeve is disposed with an inner hole,
　a diameter of the inner hole of the small end of the second shaft sleeve is smaller than a diameter of the inner hole of the large end of the second shaft sleeve,
　the small end of the second shaft sleeve is disposed with a second threaded portion,
　the second threaded portion extends out of the second connecting base, and
　the second nut is screwed to the second threaded portion.

9. The bunk bed according to claim 8, wherein the first shaft sleeve and the second shaft sleeve are made of plastic or deformable materials.

10. A bunk bed, comprising:
an upper cross member,
a lower cross member, and
a stand member, wherein:
　the stand member comprises an upper support tube, a connecting tube, and a lower support tube,
　an end portion of the upper cross member is disposed with a first connecting base,
　the first connecting base is disposed with a first conical hole vertically penetrating the first connecting base,
　a first shaft sleeve is movably disposed in the first conical hole,
　an external surface of the first shaft sleeve and a side surface of the first conical hole form a pair of sloped surfaces coupled to each other,
　a top end surface of the connecting tube is disposed with a plurality of first grooves to enable a top end portion of a side wall of the connecting tube to form a plurality of first clamping jaws,
　a bottom portion of the upper support tube is disposed in a top portion of the connecting tube,
　the first shaft sleeve encompasses the connecting tube,
　the first connecting base is coupled to the first shaft sleeve,
　the first shaft sleeve comprise a small end and a large end,
　an outer diameter of the small end of the first shaft sleeve is smaller than an outer diameter of the large end of the first shaft sleeve,
　an outer side of the upper support tube tapers outward and away from the plurality of first clamping jaws to define a first inclined surface,
　the small end of the first shaft sleeve is disposed away from the plurality of first clamping jaws and abuts the first inclined surface,
　the large end of the first shaft sleeve abuts the first inclined surface and the plurality of first clamping jaws to enable the plurality of first clamping jaws to be deformed to hold the upper support tube, and
　an end portion of the lower cross member, a top portion of the lower support tube, and a bottom portion of the connecting tube are connected together.

11. The bunk bed according to claim 10, wherein:
an end portion of the lower cross member is disposed with a second connecting base,
the second connecting base is disposed with a second conical hole vertically penetrating the second connecting base,
a second shaft sleeve is movably disposed in the second conical hole,
an external surface of the second shaft sleeve and a side surface of the second conical hole form a pair of sloped surfaces coupled to each other,
a top end surface of the lower support tube is disposed with a plurality of second grooves to enable a top end portion of a side wall of the lower support tube to form a plurality of second clamping jaws,
the bottom portion of the connecting tube is disposed in the top portion of the lower support tube,
the second shaft sleeve encompasses the lower support tube,
the second connecting base is coupled to the second shaft sleeve,
the second shaft sleeve comprise a small end and a large end,
an outer diameter of the small end of the second shaft sleeve is smaller than an outer diameter of the large end of the second shaft sleeve,
an outer side of the lower support tube tapers outward and away from the plurality of second clamping jaws to define a second inclined surface,
the small end of the second shaft sleeve is disposed away from the plurality of second clamping jaws and abuts the second inclined surface, and
the large end of the second shaft sleeve abuts the second inclined surface and the plurality of second clamping jaws to enable the plurality of second clamping jaws to be deformed to hold the lower support tube.

12. The bunk bed according to claim 11, comprising:
a first nut, and
a second nut, wherein:
　the first shaft sleeve is conical,
　the external surface of the first shaft sleeve is a conical surface,
　the small end of the first shaft sleeve is disposed with an inner hole,
　the large end of the first shaft sleeve is disposed with an inner hole,
　a diameter of the inner hole of the small end of the first shaft sleeve is smaller than a diameter of the inner hole of the large end of the first shaft sleeve,
　the small end of the first shaft sleeve is disposed with a first threaded portion,
　the first threaded portion extends out of the first connecting base,
　the first nut is screwed to the first threaded portion, the second shaft sleeve is conical,
the external surface of the second shaft sleeve is a conical surface,
the small end of the second shaft sleeve is disposed with an inner hole,
the large end of the second shaft sleeve is disposed with an inner hole,
a diameter of the inner hole of the small end of the second shaft sleeve is smaller than a diameter of the inner hole of the large end of the second shaft sleeve,
the small end of the second shaft sleeve is disposed with a second threaded portion,
the second threaded portion extends out of the second connecting base, and
the second nut is screwed to the second threaded portion.

\* \* \* \* \*